(12) United States Patent
Miller et al.

(10) Patent No.: US 8,547,863 B2
(45) Date of Patent: Oct. 1, 2013

(54) MF-TDMA SATELLITE LINK POWER CONTROL

(75) Inventors: Mark J. Miller, Vista, CA (US); Donald W. Becker, Rancho Santa Fe, CA (US)

(73) Assignee: ViaSat, Inc., Carlsbad, CA (US)

( * ) Notice: Subject to any disclaimer, the term of this patent is extended or adjusted under 35 U.S.C. 154(b) by 413 days.

(21) Appl. No.: 12/831,972

(22) Filed: Jul. 7, 2010

(65) Prior Publication Data

US 2011/0007647 A1    Jan. 13, 2011

Related U.S. Application Data

(60) Provisional application No. 61/224,345, filed on Jul. 9, 2009, provisional application No. 61/224,355, filed on Jul. 9, 2009, provisional application No. 61/223,878, filed on Jul. 8, 2009.

(51) Int. Cl.
*H04L 1/00* (2006.01)
*H04L 12/26* (2006.01)
*G08C 15/00* (2006.01)

(52) U.S. Cl.
USPC .......................................... 370/252

(58) Field of Classification Search
None
See application file for complete search history.

(56) References Cited

U.S. PATENT DOCUMENTS

| | | | | |
|---|---|---|---|---|
| 3,706,933 A | * | 12/1972 | Bidell et al. | 375/149 |
| 6,625,255 B1 | * | 9/2003 | Green et al. | 379/1.04 |
| 8,023,489 B2 | * | 9/2011 | Schiff | 370/345 |
| 8,077,629 B2 | * | 12/2011 | Miller | 370/252 |
| 2009/0195444 A1 | | 8/2009 | Miller | |

OTHER PUBLICATIONS

U.S. Appl. No. 12/831,972, filed Jul. 7, 2010, Miller et al.
U.S. Appl. No. 12/831,958, filed Jul. 7, 2010, Miller et al.

* cited by examiner

*Primary Examiner* — Ayaz Sheikh
*Assistant Examiner* — Blanche Wong
(74) *Attorney, Agent, or Firm* — Kilpatrick Townsend & Stockton LLP (57) ABSTRACT

A method for determining attenuation settings across carriers in a return link bandwidth of a user terminal comprises determining a first attenuation setting for a user terminal at a first transmission frequency, where the first attenuation setting is based on a first signal quality metric value of a first message sent from the user terminal at the first transmission frequency. The method also comprises determining a second attenuation setting for the user terminal at a second transmission frequency, where the second attenuation setting is based on a second signal quality metric value of a second message sent from the user terminal at the second transmission frequency. The method also comprises determining the attenuation settings across the carriers in the return link bandwidth of the user terminal based on the first attenuation setting and the second attenuation setting.

11 Claims, 6 Drawing Sheets

FIG. 6

MF-TDMA SATELLITE LINK POWER CONTROL

CROSS-REFERENCES TO RELATED APPLICATIONS

The present application claims benefit of priority under 35 U.S.C. 119(e) of U.S. Provisional Application Nos. 61/224,355, filed Jul. 9, 2009, entitled "MF-TDMA Satellite Link Power Control;" 61/223,878, filed Jul. 8, 2009, entitled "Interference Resistant Satellite Link Power Control Using Downlink Beacon;" and 61/224,345, filed Jul. 9, 2009, entitled "Interference Resistant Satellite Link Power Control Using Uplink Noise Measurements," the contents of which are incorporated herein by reference in their entirety.

The following U.S. nonprovisional patent applications, including the present application, are being filed concurrently, and the disclosure of the other applications are incorporated by reference in the present application in their entirety for all purposes:

U.S. Nonprovisional patent application Ser. No. 12/831,958, filed Jul. 7, 2010, now U.S. Pat. No. 8,385,223, entitled "Interference Resistant Satellite Link Power Control Using Downlink Beacon".

U.S. Nonprovisional patent application Ser. No. 12/831,972, filed Jul. 7, 2010, entitled "MF-TDMA Satellite Link Power Control".

U.S. Nonprovisional patent application Ser. No. 12/831,966, filed Jul. 7, 2010, now U.S. Pat. No. 8,436,09, entitled "Interference Resistant Satellite Link Power Control Using Uplink Noise Measurements".

FIELD OF THE INVENTION

The present invention relates generally to satellite communications systems. More particularly, the present invention relates to methods and apparatuses for providing return link power control in satellite communications systems.

BACKGROUND

Satellite communications systems transmit content over large geographic regions. In a typical satellite communications system, end users interface with the system through user terminals. The user terminals communicate, via one or more satellites, with one or more gateway terminals. The gateway terminals may process and route data to and from one or more networks according to various protocols.

A typical hub-spoke spot beam satellite communications system may include a non-processing "bent pipe" spot beam satellite, many user terminals, and a smaller number of gateway terminals. Each user terminal may be connected to a network, such as the internet, via a series of communication links.

A forward link of a satellite communications system may consist of forward uplink transmissions from a gateway terminal to a satellite, a "bent pipe" repeater at the satellite, and forward downlink transmissions to a group of user terminals located in a common spot beam. The forward link may carry data from a gateway terminal to many different user terminals. The forward link may utilize, for example, time Division Multiplexing (TDM) and/or Frequency Division Multiplexing (FDM) of data into RF transmissions.

A return link of a satellite communications system may consist of return uplink transmissions from user terminals in a common spot beam to a satellite and return downlink transmissions from the satellite to a gateway terminal servicing the spot beam. Transmissions from many user terminals may utilize the return link simultaneously using various time and frequency division multiple access techniques. This may be referred to as Multi Frequency Time Division Multiple Access (MF-TDMA).

In typical MF-TDMA systems, each user terminal, or alternatively each burst transmitted by a user terminal, may be assigned one or more transmission slots consisting of a carrier center frequency and time interval. While user terminals are generally assigned to transmit on only one carrier at a time, the transition between carriers can be very dynamic (potentially burst to burst). Carrier and transmission frequency may be varied over a wide range of return link spectrum. This may be referred to as fast frequency hopping. With current frequency synthesizer technology, carrier separation of hundreds of MHz or more is readily achievable in low cost user terminals.

The large frequency separation between carriers can cause frequency gain variations within components of the satellite communications system. Within a user terminal, for example, the frequency gain of an indoor unit (IDU), an outdoor unit (ODU), and an inter facility link (IFL) can be significant. The IFL may be a connection, such as a coaxial cable, between the IDU and the ODU. The frequency gain within a low cost user terminal may vary by as much as 5-7 dB or more. Further, this variation may change with environmental conditions such as temperature. While the variation can be minimized by using precision electronic components and sophisticated data analysis techniques, these solutions increase costs and are not viable solutions for low cost user terminals commonly used in consumer applications.

The frequency gain variation may lead to error in return link power control. A typical return link power control system may measure a signal-to-noise ratio (SNR) of a received burst at a gateway and send an attenuation adjustment command to a user terminal. The system attempts to adjust effective isotropic radiated power (EIRP) at the user terminal to provide a desired SNR at the gateway. The EIRP at the user terminal may be adjusted using a programmable attenuator at the IDU or the ODU. The programmable attenuator may be a voltage variable attenuator (VVA) or a digital step attenuator.

Power control systems that adjust EIRP based on measured SNR, however, operate poorly in MF-TDMA systems. As an example, a system that uses an SNR error (difference between measured SNR and desired SNR) in a current burst to set EIRP may fail if the next burst is assigned on a different carrier frequency. The EIRP (or attenuation setting) may be accurate only for the previous carrier frequency. In such systems, frequency gain variations of 5-7 dB can lead to 5-7 dB of power control error. Another power control scheme may average the SNR error over a period of time and across all carrier frequencies to determine an average attenuation setting. Here, frequency gain variations of 5-7 dB may result in 2.5-3.5 dB of power control error at some frequencies. Further, the time it takes to average the SNR error may inhibit the power control system from responding to short term variations in uplink path loss such as rain fading.

Thus, there is a need for improved satellite link power control in MF-TDMA systems.

SUMMARY

The present invention provides improved power control of return link transmissions in satellite communications systems. As an example, some embodiments assign a "home channel" to each user terminal within the satellite communications system. The user terminal EIRP (or attenuation setting) for the home channel may be adjusted based on a difference between a measured value and a target value of a signal quality metric. A calibration table may also be utilized to provide attenuation settings across carriers in at least a portion of the return link bandwidth. Such embodiments can provide a balance of signal power spectral densities at the satellite. This can reduce interference from other spot beams using the same or similar frequencies and keep return link satellite EIRP fairly shared among all return link transmissions.

In accordance with an embodiment of the invention, a method for transmitting a burst transmission from a user terminal to a gateway terminal in a satellite communications system comprises receiving an assignment at the user terminal to transmit the burst transmission on a first channel and obtaining a second attenuation setting at the user terminal for a second channel. The method also comprises determining a first attenuation setting at the user terminal for the first channel based at least in part on the second attenuation setting, where the first attenuation setting is different than the second attenuation setting and a difference between the first attenuation setting and the second attenuation setting is based at least in part on a frequency gain between the first channel and the second channel. The method also comprises transmitting the burst transmission on the first channel from the user terminal to the gateway terminal using the first attenuation setting.

In accordance with another embodiment of the invention, a method for determining attenuation settings across carriers in a return link bandwidth of a user terminal in a satellite communications system comprises determining a first attenuation setting for a user terminal at a first transmission frequency, where the first attenuation setting is based at least in part on a first signal quality metric value of a first message sent from the user terminal at the first transmission frequency. The method also comprises determining a second attenuation setting for the user terminal at a second transmission frequency, where the second attenuation setting is based at least in part on a second signal quality metric value of a second message sent from the user terminal at the second transmission frequency. The first attenuation setting may be different than the second attenuation setting and the first transmission frequency may be different than the second transmission frequency. The method also comprises determining the attenuation settings across the carriers in the return link bandwidth of the user terminal based at least in part on the first attenuation setting and the second attenuation setting.

In accordance with another embodiment of the invention, a user terminal in a satellite communications system comprises a measuring module configured to measure a signal characteristic of one or more first messages sent from the user terminal at a first transmission frequency and to measure a signal characteristic of one or more second messages sent from the user terminal at a second transmission frequency. The user terminal also comprises a first determining module configured to determine a frequency gain of the user terminal based at least in part on the signal characteristic of the one or more first messages and the signal characteristic of the one or more second messages. The user terminal also comprises a second determining module configured to determine an attenuation setting of the user terminal at a third transmission frequency based at least in part on the frequency gain, where the first transmission frequency, the second transmission frequency, and the third transmission frequency are each different frequencies.

Numerous benefits are achieved using the present invention over conventional techniques. For example, some embodiments provide methods for adjusting EIRP to account for frequency gain variations. This can help maintain a balance of signal power spectral densities at the satellite. As another example, some embodiments provide methods for determining EIRP or attenuation settings at the user terminal. This can free up bandwidth that might otherwise be used to send EIRP adjustments or attenuation settings between the gateway and the user terminal. Depending upon the embodiment, one or more of these benefits may exist. These and other benefits are described throughout the specification and more particularly below.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label with a dash and a second label that distinguishes among the similar components. If only the first reference label is used in the specification, the description is applicable to any one of the similar components having the same reference label irrespective of the second reference label.

DETAILED DESCRIPTION

The present invention provides improved methods and apparatuses for controlling the power of return link transmissions in satellite communications systems. Some embodiments assign a home channel to each user terminal within the satellite communications system. The EIRP or attenuation setting for the home channel may be adjusted based on a difference between a measured value and a target value of a signal quality metric. The signal quality metric may be, for example, a signal power or a signal-to-noise ratio (SNR). The value of the signal quality metric may be determined based on characteristics of messages sent from user terminals to the gateway. Embodiments of the present invention may also utilize calibration tables to provide attenuation settings across carriers in at least a portion of the return link bandwidth. The calibration tables can be used to account for frequency gain variations. Such embodiments can improve system performance in MF-TDMA systems. These and other embodiments of the present invention are described more fully below.

Figure 1:
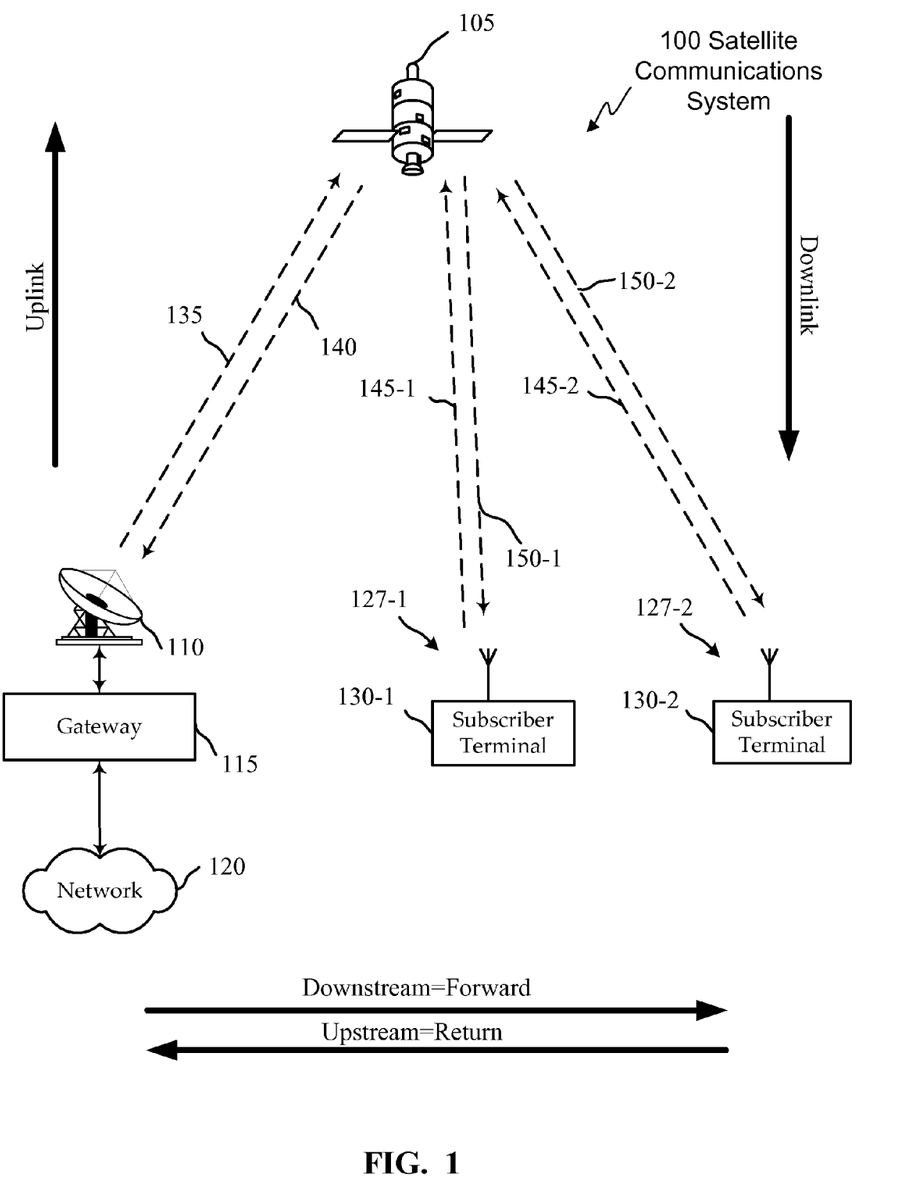
FIG. 1 is a simplified diagram of an exemplary satellite communications system in which the methods and apparatuses of the present invention may be implemented.

FIG. 1 is a simplified diagram of an exemplary satellite communications system 100 in which the methods and apparatuses of the present invention may be implemented. Satellite communications system 100 includes a network 120 interfaced with one or more gateway terminals 115. The gateway terminal 115 is configured to communicate with one or more user terminals 130 via a satellite 105.

The gateway terminal 115 is sometimes referred to as a hub or ground station. The gateway terminal 115 services uplink 135 and downlink 140 to and from the satellite 105. The gateway terminal 115 may also schedule traffic to the user terminals 130. Alternatively, the scheduling may be performed in other parts of the satellite communications system 100 (e.g., at one or more network operations centers (NOCs) and/or gateway command centers). Although only one gateway terminal 115 is shown in FIG. 1, embodiments of the present invention may be implemented in satellite communications systems having a plurality of gateway terminals each of which may be coupled to one or more networks.

In some satellite communications systems, there may be a limited amount of frequency spectrum available for transmission. Communication links between the gateway terminal 115 and the satellite 105 may use the same, overlapping, or different frequencies for communication links between the satellite 105 and the user terminals 130. The gateway terminal 115 may be located remote from the user terminals 130 to enable frequency re-use.

The network 120 may be any type of network and can include, for example, the Internet, an IP network, an intranet, a wide-area network (WAN), a local-area network (LAN), a virtual private network (VPN), a virtual LAN (VLAN), a fiber optic network, a hybrid fiber-coax network, a cable network, a public switched telephone network (PSTN), a public switched data network (PSDN), a public land mobile network, and/or any other type of network supporting data communication between devices as described herein. The network 120 may include both wired and wireless connections as well as optical links. The network 120 may connect the gateway terminal 115 with other gateway terminals that may be in communication with the satellite 105 or with other satellites.

The gateway terminal 115 provides an interface between the network 120 and the satellite 105. The gateway terminal 115 may be configured to receive data and information directed to one or more user terminals 130. The gateway terminal 115 may format the data and information for delivery to the respective user terminal(s) 130. Similarly, the gateway terminal 115 may be configured to receive signals from the satellite 105 (e.g., from one or more user terminals 130) directed to a destination accessible via the network 120. The gateway terminal 115 may format the received signals for transmission on the network 120.

The gateway terminal 115 may use an antenna 110 to transmit a forward uplink signal 135 to the satellite 105. In one embodiment, the antenna 110 may comprise a parabolic reflector with high directivity in the direction of the satellite 105 and low directivity in other directions. The antenna 110 may comprise a variety of alternative configurations and include operating features such as high isolation between orthogonal polarizations, high efficiency in the operational frequency bands, low noise, and the like.

The satellite 105 may be a geostationary satellite that is configured to receive the forward uplink signals 135 from the location of the antenna 110. The satellite 105 may use, for example, a reflector antenna, a lens antenna, a phased array antenna, an active antenna, or any other mechanism known in the art for reception of such signals. The satellite 105 may process the signals received from the gateway terminal 115 and forward the downlink signals 150 to one or more of the user terminals 130. The signals may be passed through a transmit reflector antenna (e.g., a phased array antenna) to form the transmission radiation pattern (spot beam). The satellite 105 may operate in a multiple spot-beam mode, transmitting a number of narrow beams each directed at a different region of the earth. This allows segregation of the user terminals 130 into the various narrow beams.

The satellite 105 may be configured as a "bent pipe" satellite. In this configuration, the satellite 105 may perform frequency and polarization conversion of the received carrier signals before re-transmission of the signals to their destination. A spot beam may use a single carrier, i.e., one frequency, or a contiguous frequency range per beam. A variety of physical layer transmission modulation and coding techniques may be used by the satellite 105 (e.g., adaptive coding and modulation).

The satellite communications system 100 may use a number of network architectures consisting of space and ground segments. The space segment may include one or more satellites while the ground segment may include one or more user terminals, gateway terminals, network operations centers (NOCs), and satellite and gateway terminal command centers. The segments may be connected via a mesh network, a star network, or the like as would be evident to those skilled in the art.

The forward downlink signals 150 may be transmitted from the satellite 105 to one or more user terminals 130. The user terminals 130 may receive the downlink signals 150 using an antenna 127. In one embodiment, the antenna 127 and the user terminal 130 together comprise a very small aperture terminal (VSAT), with the antenna 127 measuring approximately 0.6 meters in diameter and having approximately 2 watts of power. In other embodiments, a variety of other types of antennas 127 may be used at the user terminals 130 to receive the downlink signals 150 from the satellite 105. Each of the user terminals 130 may comprise a single user terminal or, alternatively, may comprise a hub or router (not pictured) that is coupled to multiple user terminals. Each user terminal 130 may be connected to various consumer premises equipment (CPE) comprising, for example, computers, local area networks, internet appliances, wireless networks, and the like.

In a manner similar to that described above, the user terminals 130 may use return link transmissions to communicate with the gateway terminal 115 or the network 120 via the satellite 105. As illustrated in FIG. 1, the return link may consist of return uplink transmissions 145 from the user terminals 130 to the satellite 105, and return downlink transmissions 140 from the satellite 105 to the gateway terminal 115. The gateway terminal 115 may format the received signals for transmission to one or more destinations that are accessible via the network 120.

Figure 2:
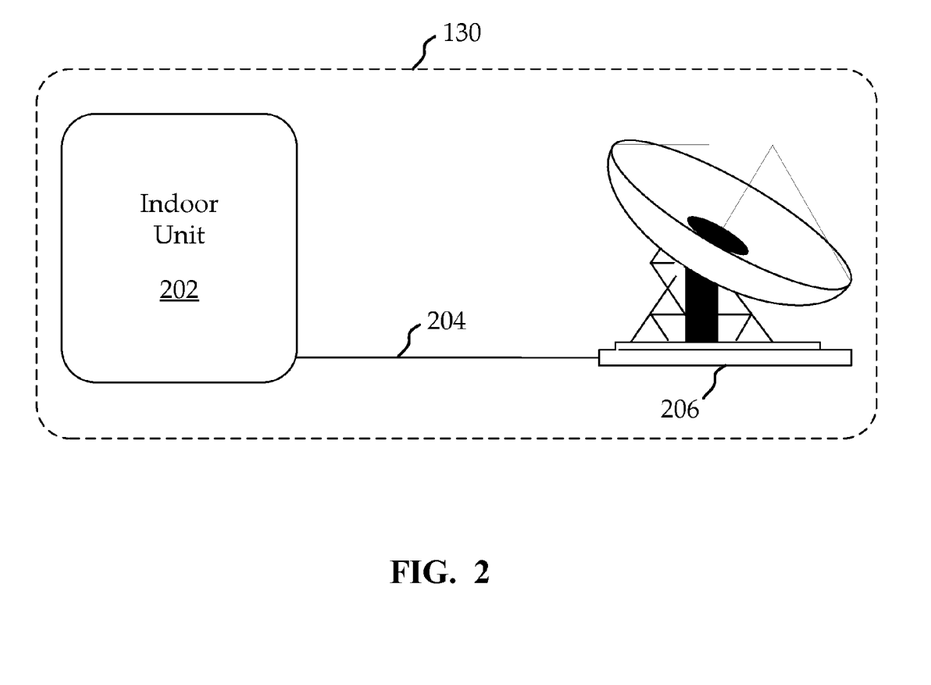
FIG. 2 is a simplified diagram of an exemplary user terminal in which some of the methods and apparatuses of the present invention may be implemented.

A typical user terminal 130 may include an outdoor unit (ODU) 206 and an indoor unit (IDU) 202 as illustrated in FIG. 2. The ODU 206 typically performs the front-end radio and antenna functions. The ODU 206 may also provide an interface to the IDU 202. The IDU 202 typically performs the modem and networking functions and provides an interface to users and CPEs. An inter-facility link (IFL) 204 is a physical connection between the IDU 202 and the ODU 206. The IFL 204 may consist, for example, of a single coaxial cable of variable length depending on the physical arrangement of the components and the particular application. Further, the construction and characteristics of the IFL 204 may vary depending on functional partitioning between the IDU 202 and the ODU 206.

In accordance with an embodiment of the present invention, each user terminal 130 within the satellite communications system 100 may be assigned a home channel. The home channel may be a specific physical channel or carrier using the highest symbol rate at which the user terminal 130 is capable of operating. The home channel may be used to perform closed loop power control at a single carrier frequency. The power control system may adjust EIRP or attenuation settings at the user terminals 130 based on a difference between a measured value and a target value of a signal quality metric. The measured value of the signal quality metric may be determined based on characteristics of a message sent from the user terminal to a gateway.

Embodiments of the present invention may also use a calibration table to provide EIRP or attenuation adjustments across carriers in at least a portion of the return link bandwidth. The return link may be segmented into one or more return channel groups (RCGs), with each RCG spanning all or a portion of the return link bandwidth. In one embodiment, for example, the return link bandwidth may span 500 MHz and be segmented into four RCGs each spanning 125 MHz. A calibration table may provide attenuation settings across carriers in one or more of the RCGs. The attenuation settings can be used to account for frequency gain variations across the carriers.

Home Channel

In some embodiments, each user terminal 130 may send periodic messages on their home channel to the gateway 115. The messages may be data transmissions or other messages and may be sent at a specified rate. The messages will be referred to broadly throughout this specification as periodic management messages (PMMs). In a particular embodiment, a PMM may be sent from each user terminal every 320-640 mSec (1.56-3.13 Hz). This frequency is generally sufficient to provide accurate tracking of dynamic return uplink fades in a typical satellite communications system. Of course, other rates may be used based on the particular application. The user terminals 130 may transmits the PMMs using the same EIRP and symbol rate that is used for data transmissions. In addition to being used for return link power control, the PMMs may also be used for non-linearity avoidance, TDMA synchronization maintenance, keep alives, bandwidth requests, forward link signal-to-noise plus interference ratio (SINR) reporting, and other communications.

Signal characteristics of each PMM may be measured or estimated and used in an exemplary return link power control system in accordance with embodiments of the present invention. The measured or estimated signal characteristic may be referred to as a signal quality metric. The target or desired value of the signal quality metric may be denoted Q*(k). Q*(k) may be determined for each channel or carrier (from k=0 to K−1) within an RCG or a return link.

The signal quality metric may be, for example, signal-to-noise ratio (SNR), signal power, or any other signal characteristic that provides an indicate of signal quality. As an example, if SNR is used as the signal quality metric, a target value (SNR*(k)) may be determined as a value slightly greater than a minimum required SNR for proper operation of a burst demodulator at the gateway 115. As another example, if signal power (or message signal power) is used as the signal quality metric, a target value (P*(k)) may be determined, for example, using methods described in copending U.S. Nonprovisional patent application Ser. Nos. 12/831,958, filed Jul. 7, 2010, now U.S. Pat. No. 8,385,223, entitled "Interference Resistant Satellite Link Power Control Using Downlink Beacon"; and 12/831,966, filed Jul. 7, 2010, now U.S. Pat. No. 8,483,609, entitled "Interference Resistant Satellite Link Power Control Using Uplink Noise Measurements".

Because the home channel power control operates on a single carrier, dependence of the signal quality metric on k will be dropped herein for brevity. It should be understood, however, that different channels may have different signal quality metric values.

In accordance with an embodiment of the present invention, values of the signal quality metric may be determined based on measurements performed by demodulators at the gateway terminal 115. The values may be determined for each PMM sent from the user terminals 130. The measured or estimated values may be ignored if the PMM contains bit errors. The errors may be determined, for example, using a cyclic redundancy check (CRC) within the PMM.

In accordance with another embodiment of the present invention, the values of the signal quality metric may be determined based on measurements performed at the user terminal 130. For example, if message signal power (P*(k)) is used as the signal quality metric, a power detector at the user terminal 130 may be used to provide signal power measurements. In an embodiment, the power detector may be disposed at an output of a solid state power amplifier (SSPA) of the ODU 206 to capture a gain of the user terminal 130 (e.g., IDU 202, IFL 204, ODU 206). The measurements may be sent from the ODU 206 to the IDU 202 via a telemetry link for processing. Performing the measurements at the user terminal 130 is advantageous in that the gateway 115 does not have to perform the measurements or process the data and system bandwidth is not used sending results to the user terminals 130. Also, the measurements are not corrupted by propagation channel impairments, for example, additive noise and multiplicative scintillation.

The measured or estimated signal quality metric values, as determined from measurements at the gateway terminal 115 or at the user terminals 130, may be compared to a target value. The difference between the measured or estimated values and the target value may be used to determine EIRP or attenuation settings on the home channel for the user terminal 130. If the measurements are performed at the gateway terminal 115, the EIRP or attenuation settings may be sent from the gateway terminal 115 to the user terminal 130. If the measurements are performed at the ODU 206, the results may be sent to the IDU 202 for processing.

Home Channel Power Control

Figure 3:
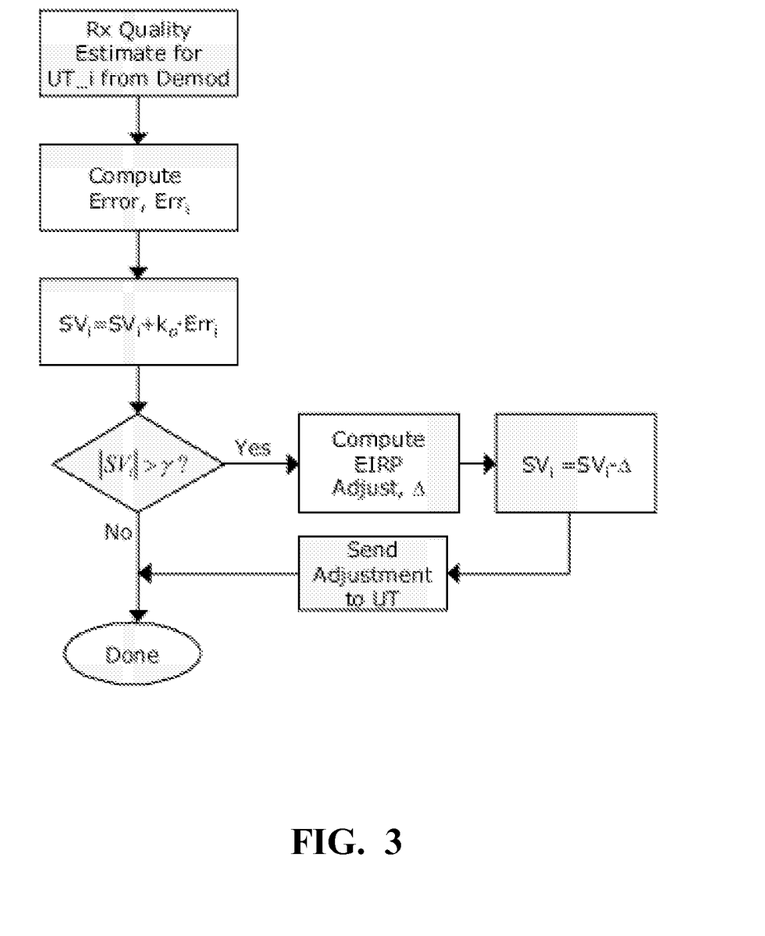
FIG. 3 is a simplified flowchart illustrating an exemplary method of return link power control in accordance with an embodiment of the present invention.

FIG. 3 is a simplified flowchart illustrating an exemplary method of return link power control in accordance with an embodiment of the present invention. The exemplary method may be performed for each PMM sent from a user terminal 130 on its home channel. A signal quality metric value may be determined for each PMM (e.g., for every correctly received PMM), based on an average of some number of PMMs, at specified intervals, or the like as would be appreciated by one of ordinary skill in the art. As illustrated in this example, an estimated signal quality metric value is determined for user terminal number i (labeled "Rx Quality Estimate for UT_i from Demod" in FIG. 3). An error ($Err_i$) may be computed using the following equation:

$$Err_i = Q^* - Q_i \qquad (1)$$

where $Q^*$ is the target signal quality metric value, and $Q_i$ is the measured or estimated signal quality metric value for the PMM burst. If the PMM was not received error free then $Err_i$ may be set to zero.

The filter state variable ($SV_i$) may be compared against a threshold ($\gamma$) to determine if EIRP (or attenuation settings) of the user terminal 130 should be adjusted. The threshold is typically an adjustable parameter and in one embodiment may be in the range of about 0.25 to about 0.5 dB. $k_o$ is a loop filtering parameter that may be a function of the PMM interval. A typical value for $k_o$ may be, for example, about 1 second.

If an EIRP (or attenuation) adjustment is necessary, it may be computed using the equation:

$$\Delta = q \cdot \text{round}\left(\frac{SV_i}{q}\right) \quad (2)$$

where q is a desired resolution of the adjustment, and $$\text{round}\left(\frac{SV_i}{q}\right)$$

rounds to the next integer value. The adjustment may be sent to the user terminal 130, or the adjustment may be used to determine an adjusted EIRP value or attenuation setting that may be sent to the user terminal 130.

Calibration Tables

In accordance with an embodiment of the present invention, a calibration table may be utilized to provide attenuation settings across carriers in at least a portion of the return link bandwidth. A calibration table may be provided for each user terminal 130. This enables each user terminal 130 to hop across channels and apply the appropriate compensation to equalize any net frequency gain. For transmission on carriers other than the home channel, for example, the home channel attenuation setting may be modified by a difference between a calibration table value for the home channel and a calibration table value for the desired carrier. The attenuation setting may also be modified to account for a difference in symbol rate (if any) between the home channel and the desired carrier.

In an embodiment, the calibration table of each user terminal 130, Cal_table(j), may be organized as J entries, $j \in [0, J-1]$, with each entry corresponding to a potential center frequency ($f_j$) of a carrier within the RCG. If the carriers in the RCG are constrained to be the same symbol rate, then the potential center frequencies may be determined by:

$$f_j = (j+1)(1+\alpha)\frac{R_{sym}}{2} \quad j \in [0, J-1] \quad (3)$$

where $R_{sym}$ is the symbol rate and $\alpha$ is the square root shaping factor (SRRC), commonly set to approximately 0.25. When the carrier symbol rates in the RCG are not constrained to be equal, but constrained to be related to each other by a factor of 2, such as 625 ksps, 1.25 Msps, 2.5 Msps, 5 Msps, etc., Equation (3) can be used by replacing $R_{sym}$ with a minimum symbol rate of the carriers in the RCG. For other RCG symbol rate possibilities, a similar technique can be used to generate possible center frequencies. Since all possible channel center frequencies may be captured in the calibration table, the calibration table may not need to be adjusted if the number of carriers, center frequencies (e.g., channelization), and/or symbol rates within the RCG are altered.

Calibration table values may be determined or updated, for example, at a specified frequency or upon occurrence of a specified event. As an example, calibration table values may be determined after a login process by a newly registered user terminal 130 within the satellite communications system 100. As another example, calibration table values may be determined after an ODU 206 of a user terminal 130 has been replaced. The calibration table values are generally determined after the home channel EIRP or attenuation settings have been determined.

The process of determining the calibration table values may be periodically repeated to capture changes in the frequency gain. Relatively slow changes in the system can be captured that might occur, for example, due to thermal drift of the characteristics of the ODU 206, IFL 204, and/or the IDU 202. The calibration table values may be determined based on (1) measurements performed at the gateway terminal 115, or (2) measurements performed at the user terminal 115.

(1) Measurements Performed at the Gateway Terminal

In some embodiments, the calibration table values may be determined based on measurements performed at the gateway terminal 115. The calibration table values may be determined by transmitting a series of PMMs on each physical channel within an RCG (this may include the home channel). The PMMs may be transmitted from the user terminal 130 to the gateway terminal 115. Demodulators at the gateway terminal 115 may be used to perform measurements, such as amplitude estimates, that can be used to determine estimated signal quality metric values for each of the received PMMs. Using this data, the calibration table values for each channel may be determined. For example, if message signal power (P*(k)) is used as the signal quality metric, the calibration table values may be determined based on an estimated signal power of the PMMs on each channel.

As part of determining the calibration table values, or prior to determining the calibration table values, the home channel EIRP or attenuation settings may be determined using PMMs sent on the home channel. In one embodiment, for example, a series of PMMs are first assigned on the home channel and a common mode tracking loop (or home channel tracking loop) may operate for a specified duration (e.g., approximately 5 time constants) to allow the loop to settle. This ensures that the EIRP of the user terminal 130 is properly set for the home channel.

Once the EIRP of the home channel has been determined, the user terminal 130 may transmit a series of PMMs on each physical channel within an RCG. In one embodiment, for example, the user terminal 130 may transmit a series of 16 PMMs on each channel. The symbol rate of the home channel may be denoted $R_{sym}(HC)$, and the mod/codepoint assigned for transmission of the PMMs may be determined as follows:

For the home channel, the beam mod/codepoint used for traffic during clear sky conditions may be used.

For channels with $R_{sym}(k) \leq 2R_{sym}(HC)$, a robust mod/codepoint may be used. This should allow link closure with the user terminal 130 frequency response (which may cause a lower EIRP) and a symbol rate up to twice that of the home channel.

For channels with $R_{sym} > 2R_{sym}(HC)$, the most robust mod/codepoint may be used. This should provide the best chance at link closure for symbol rates greater than twice that of the home channel.

The robust mod/codepoint is generally selected to be $\approx 3$ dB more robust than the beam mod/codepoint. The beam mod/codepoint is the mod/codepoint that that is normally used for transmissions and is generally the same for all channels. This mod/codepoint may be determined as part of the system design or based on actual or expected operation of the satellite communications system 100. An exemplary mod/codepoint library and robust mod/codepoints are shown in TABLE 1 below.

TABLE 1

| Beam Mod/Codepoint | Robust Mod/Codepoint |
|---|---|
| 2.25 bits/sym (8-PSK, r = 3/4) | 1.75 bits/sym (8-PSK, r = 7/12) |
| 2.00 bits/sym (8-PSK, r = 2/3) | 1.50 bits/sym (QPSK, r = 3/4) |
| 1.75 bits/sym (8-PSK, r = 7/12) | 1.25 bits/sym (QPSK, r = 5/8) |
| 1.50 bits/sym (QPSK, r = 3/4) | 1.00 bits/sym (QPSK, r = 1/2) |
| 1.25 bits/sym (QPSK, r = 5/8) | 0.75 bits/sym (QPSK, r = 3/8) |
| 1.00 bits/sym (QPSK, r = 1/2) | 0.50 bits/sym (QPSK, r = 1/2) |

The user terminal 130 may transmit PMMs on these assigned slots using a modulator attenuation value of:

$$Atten(k) = Atten(HC) + \text{Log}_{10}\left(\frac{R_{sym}(HC)}{R_{sym}(k)}\right) \text{ for } R_{sym}(k) < R_{sym}(HC) \quad (4)$$

$$Atten(k) = Atten(HC) \text{ for } R_{sym}(k) \geq R_{sym}(HC) \quad (5)$$

In some embodiments, the user terminal 130 may adjust attenuation to compensate for changes in symbol rate. As an example, the attenuation may be compensated for symbol rates that are lower than that of the home channel but not for symbol rates that are higher than that of the home channel. Using this approach ensures:
  a) The user terminal 130 is not required to transmit using a power that is higher than the power used on the home channel;
  b) The EIRP density is the same for channels with symbol rates less than or equal to the home channel if the frequency gain of the user terminal 130 (e.g., ODU 206, IDU 202, and/or IFL 204) is relatively flat; and
  c) The EIRP density is lower for channels with symbol rates that are higher than the home channel.

A signal quality metric value may be determined for each of the PMMs received at the gateway terminal 115. Denoting the measurements on channel k as $Q_n(k)$, an average signal quality metric for each channel may be computed using the equation:

$$Q_{ave}(k) = \frac{1}{N}\sum_{n=0}^{N-1} Q_n(k) \quad (6)$$

where N is the number of PMMs that were correctly received on channel k, and $Q_n(k)$ is the $n^{th}$ measurement on channel k.

If the signal quality metric is message signal power, for example, a burst demodulator at the gateway terminal 115 may provide signal power measurements in units of dB relative to some reference. If the measurements are not in units of dB, the measurements may be converted to dB before summing (e.g., by performing 10*log(x)). Alternatively, the measurements may be converted to dB after summing (e.g., by performing 10*Log $Q_{ave}(k)$). Both approaches provide $Q_{ave}(k)$ in dB.

For channels using a symbol rate of $2R_{sym}(HC)$, it is possible that not all of the PMMs will be received error free if the EIRP was not increased by 3 dB to accommodate the higher symbol rate. However, accounting for link margins, worst case interference, and slope of PMM block error rate (BLER) curves, the probability of receiving a PMM correctly is likely at least 50%. For channels with symbol rates>$2R_{sym}(HC)$, there is a higher probability that not all of the PMMs will be received error free. Using the most robust codepint (BPSK, r=½) for the higher symbol rates, however, should allow one or more of the PMMs in each series to be received correctly on each channel. In some embodiments, at least one correctly received PMM will be sufficient for generation of the calibration table.

Each average signal quality metric value $Q_{ave}(k)$ may be associated with a physical channel having a center frequency $f_k$. The frequency $f_k$ may be an offset from a lower edge of a start of an RCG (as seen at IF) measured in Hz. The powers and frequencies may be normalized to form K ordered pairs of data points [$f_k$, X(k)] where:

$$X(k) = Q_{ave}(k) - 10 \log 10(R_{sym}(k)) \text{ when } R_{sym}(k) < R_{sym}(HC) \quad (7)$$

$$X(k) = Q_{ave}(k) - 10 \log 10(R_{sym}(HC)) \text{ when } R_{sym}(k) \geq R_{sym}(HC) \quad (8)$$

The normalized data points may be used to fit a curve to the data. In one embodiment, for example, the normalized data points may be used to determine the coefficients ($a_0$, $a_1$, $a_2$) of a $2^{nd}$ order polynomial. The polynomial may be used to describe the frequency gain at any point within the RCG. Higher order polynomials (e.g., third or fourth order) can be used but are generally not necessary.

Generation of the coefficients ($a_0$, $a_1$, $a_2$) is typically performed using a standard least squares algorithm. The average signal quality metric values may include thermal noise, scintillation, and IFL ripple components. The standard least squares algorithm can provide smoothing across frequency to minimize these effects.

In an embodiment, the coefficients may be sent from the gateway terminal 115 to the user terminal 130. The user terminal 130 may use the coefficients to generate the calibration table at calibration frequencies $f_j$ using the following equation:

$$\text{Cal\_table}[j] = a_2 x^2 + a_1 x + a_0 |_{x = f_j / W_{RCG}} \quad (9)$$

The scheduling of PMMs on all channels within an RCG should generally be completed in an interval that is short enough such that the propagation conditions (excluding scintillation) do not change significantly. It is typical to use approximately 1 second as a scheduling guideline. This is short enough for a static propagation loss assumption to hold for all but the heaviest rain storms. The later is easily detected by reduced symbol rate in the home channel, in which case it is preferable to delay determining the calibration table values until the home channel symbol rate returns to its maximum value.

Bounds on the duration of assignment time needed to schedule the PMMs on each channel can be determined. For example, if each PMM comprises 363 symbols, and assuming 1 bit/sym robust codepoint (beam codepoint=1.5 bits/sym) and a symbol rate of 625 ksps, the assignment time needed to schedule 16 PMMs on a single 625 ksps channel is 9.3 mSec. The PMM bursts need not be transmitted consecutively, but they should be transmitted in an interval that is short enough such that the propagation loss is fairly constant.

(2) Measurements Performed at the User Terminal

In accordance with another embodiment of the present invention, the calibration table values may be determined based on measurements performed at the user terminal 130. For example, if message signal power (P*(k)) is used as the signal quality metric, a power detector at the ODU 206 may be used to provide signal power measurements. The data may be sent from the ODU 206 to the IDU 202 via a telemetry link for processing.

Similar to the process of performing measurements at the gateway terminal 115, the process of performing measurements at the user terminal 130 may include scheduling a series of PMMs on each channel within an RCG. Measurements may be performed on each PMM transmitted. The measurement data may be conveyed to a processing entity within the user terminal 130. This is typically a microprocessor located within the IDU 202. A low rate digital telemetry link within the IFL 204 may be used to convey the data to the IDU 202. This telemetry link may be frequency division multiplexed onto the same coaxial cable as the IF signals, or the telemetry link may include a separate cable or wireless connection. The data may be normalized using the process described above with regard to Equations (7)-(8). A standard least squares algorithm may be used to determine polynomial coefficients and a calibration table may be generated as described above with regard to Equation (9). This process may be periodically repeated to allow the calibration data to be updated to capture changes in frequency gain.

Calibration Table Utilization

A home channel attenuation value Atten(HC) may be determined for each user terminal. This attenuation value is typically in dB. The home channel tracking loop may modify this attenuation value in accordance with rain conditions. For transmission of bursts on channels other than the home channel, the user terminal 130 may use an attenuation value given by the following equation:

$$Atten(k) = \qquad (10)$$
$$Atten(HC) + \text{Cal\_table}(j) - \text{Cal\_table}(j\_HC) + 10\text{Log}_{10}\left(\frac{R_{sym}(HC)}{R_{sym}(j)}\right)$$

where j is the calibration table index having the same frequency as center of physical channel k ($f_j$ as defined by Equation (3)) and j_HC is the calibration table index having the same frequency as the center of the home channel.

A user terminal 130 will generally be assigned a home channel that uses the largest symbol rate possible. As it rains, the power control system may increase the EIRP of the user terminal 130 to compensate for the rain fade. Eventually, there may be a need to reduce the symbol rate to prevent the user terminal 130 from running out of EIRP. This is accomplished by moving the user terminal 130 to another home channel with a smaller symbol rate. When this occurs, the new home channel attenuation may be computed as:

$$Atten(HC\_new) = Atten(HC\_old) + \text{Cal\_table}(j\_new) - \qquad (11)$$
$$\text{Cal\_table}(j\_old) + 10\text{Log}_{10}\left(\frac{R_{sym}(HC\_old)}{R_{sym}(HC\_new)}\right)$$

where j_new is the calibration table index associated with the new home channel and j_old is the calibration table index associated with the old home channel. The home channel tracking loop may operate using PMMs on the new home channel and the EIRP adjustment commands may be applied to the attenuation value of the new home channel. Attenuation values for channels other than the new home channel, including the old home channel, may be calculated using Equation (10), with j_HC referring to the calibration table index associated with the new home channel.

In another embodiment, the user terminal 130 may use the polynomial coefficients to generate attenuation adjustments directly, rather than pre-compute and store the calibration table values for all possible center frequencies.

Calibration Table Updates

The calibration table for each user terminal may be updated at a specified frequency or upon occurrence of a specified event. The update frequency may be configurable and may be the same or different for each user terminal. An update process may involve repeating the calibration table generation process described previously.

The overhead for various update frequencies and robust codepoints is shown in TABLE 2 below. This table is generated assuming:

RCG Bandwidth=62.5 MHz, 50 Msps per RCG;

6250 logged in subscribers per RCG;

20 physical channels per RCG; and

16 PMMs transmitted per physical channel.

TABLE 2

| Beam Spectral Efficiency (bits/sym) | | | | | | Cal. Table Generation Interval | | | |
| --- | --- | --- | --- | --- | --- | --- | --- | --- | --- |
| 2.25 | 2.00 | 1.75 | 1.50 | 1.25 | 1.00 | Min. | Hr. | Day | Week |
| 10.40% | 11.87% | 13.67% | 15.27% | 18.67% | 24.20% | 1 | 0.02 | 0.00 | 0.00 |
| 1.04% | 1.19% | 1.37% | 1.53% | 1.87% | 2.42% | 10 | 0.17 | 0.01 | 0.00 |
| 0.35% | 0.40% | 0.46% | 0.51% | 0.62% | 0.81% | 30 | 0.50 | 0.02 | 0.00 |
| 0.17% | 0.20% | 0.23% | 0.25% | 0.31% | 0.40% | 60 | 1 | 0.04 | 0.01 |
| 0.09% | 0.10% | 0.11% | 0.13% | 0.16% | 0.20% | 120 | 2 | 0.08 | 0.01 |
| 0.01% | 0.02% | 0.02% | 0.02% | 0.03% | 0.03% | 720 | 12 | 0.50 | 0.07 |
| 0.01% | 0.01% | 0.01% | 0.01% | 0.01% | 0.02% | 1440 | 24 | 1 | 0.14 |
| 0.00% | 0.00% | 0.00% | 0.00% | 0.00% | 0.00% | 10080 | 168 | 7 | 1 |

As can be seen in TABLE 2, the overhead associated with calibration table updates of once per day is low. For example, using a beam codepoint of 1.5 bits/sym (robust codepoint=1 bits/sym), the overhead is 0.02%. The calibration table update rate could be increased to once per 30 minutes with an overhead of leas than 1%.

If temperature variations cause changes in frequency gain, the update frequency could be increased to as often as once per 30 minutes or even once per 10 minutes. If the number of logged in subscribers per RCG is large and the overhead associated with calibration table updates is a concern, or more frequent updates are required, the overhead may be reduced by performing the updates on an "as required" basis for some or all of the user terminals 130. Using this approach, inactive terminals or terminals without drift in frequency gain may be updated less frequently. User terminals that are active or that are expected to have drift in frequency gain, as detected, for example, by large ambient temperature changes, may perform calibration table updates more frequently.

RCG Re-Configuration

For return channel systems that are not constrained to use the same symbol rate for each carrier in an RCG, it is sometimes desirable to change the allocation of carriers. This is referred to as RCG re-configuration. In some embodiments, no special action is required by the user terminals 130 for RCG re-configuration. Calibration table values may be determined for all possible center frequency locations. If a user terminal's home channel changes as a result of the re-configuration, the user terminal may perform the same actions as a normal home channel update.

Figure 4:
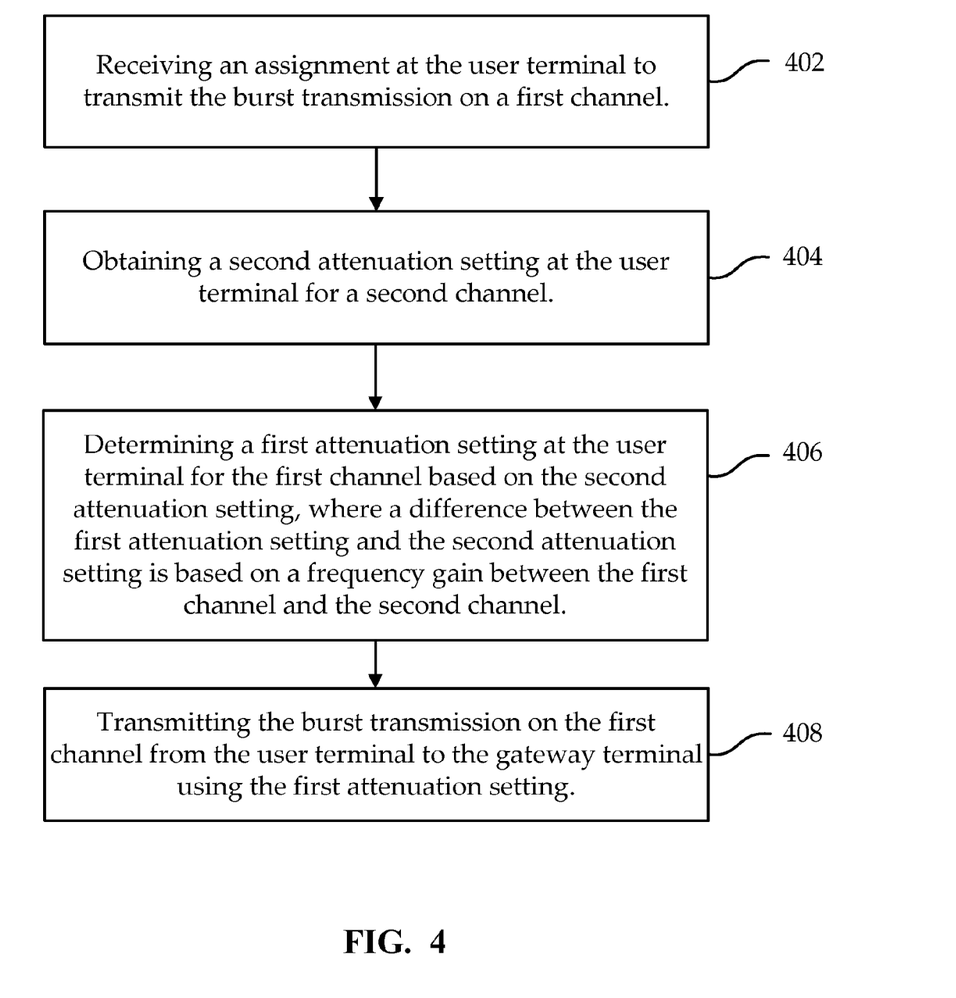
FIG. 4 is a simplified flowchart illustrating an exemplary method for transmitting a burst transmission from a user terminal to a gateway terminal in a satellite communications system in accordance with an embodiment of the present invention.

FIG. 4 is a simplified flowchart illustrating an exemplary method for transmitting a burst transmission from a user terminal to a gateway terminal in a satellite communications system in accordance with an embodiment of the present invention. The method includes receiving an assignment at the user terminal to transmit the burst transmission on a first channel (402). The method also includes obtaining a second attenuation setting at the user terminal for a second channel (404). The method also includes determining a first attenuation setting at the user terminal for the first channel based at least on part on the second attenuation setting (406). The first attenuation setting may be different than the second attenuation setting, and a difference between the first attenuation setting and the second attenuation setting being based at least in part on a frequency gain between the first channel and the second channel. In an embodiment, the first attenuation setting may be based on a first message signal power estimate on the first channel, and the second attenuation setting may be based on a second message signal power estimate on the second channel. In another embodiment, the first attenuation setting may be based on a first signal-to-noise ratio on the first channel, and the second attenuation setting may be based on a second signal-to-noise ratio on the second channel. The method also includes transmitting the burst transmission on the first channel from the user terminal to the gateway terminal using the first attenuation setting (408). An EIRP of the burst transmission may be based on the first attenuation setting.

Figure 5:
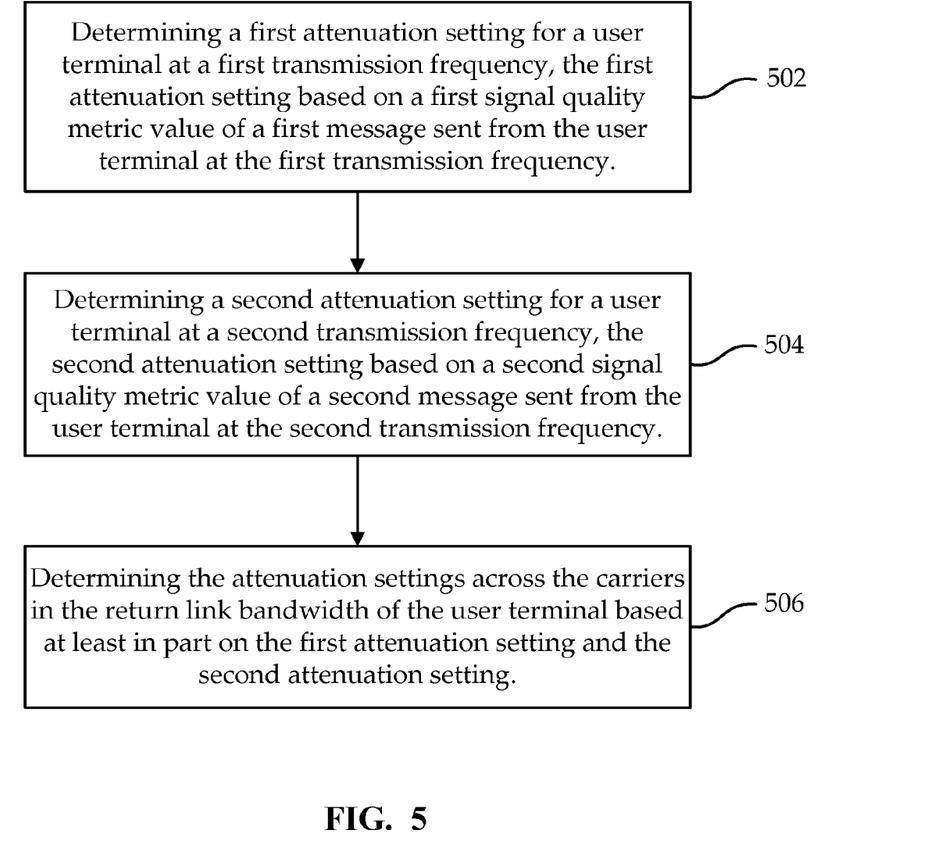
FIG. 5 is a simplified flowchart illustrating an exemplary method for determining attenuation settings across carriers in return link bandwidth of a user terminal in a satellite communications system in accordance with an embodiment of the present invention.

FIG. 5 is a simplified flowchart illustrating an exemplary method for determining attenuation settings across carriers in a return link bandwidth of a user terminal in a satellite communications system in accordance with an embodiment of the present invention. The method includes determining a first attenuation setting for a user terminal at a first transmission frequency (502). The first attenuation setting may be based at least in part on a first signal quality metric value of a first message sent from the user terminal at the first transmission frequency. In an embodiment, the first attenuation setting may be based on one or more measurements performed at the user terminal. In another embodiment, first attenuation setting may be based on one or more measurements performed at a gateway terminal. The method also includes determining a second attenuation setting for the user terminal at a second transmission frequency (504). The second attenuation setting may be based at least in part on a second signal quality metric value of a second message sent from the user terminal at the second transmission frequency. The first attenuation setting may be different than the second attenuation setting, and the first transmission frequency may be different than the second transmission frequency. The method also includes determining the attenuation settings across the carriers in the return link bandwidth of the user terminal based at least in part on the first attenuation setting and the second attenuation setting (506). In an embodiment, the method also includes transmitting a burst transmission at the second transmission frequency from the user terminal to a gateway terminal using the attenuation settings.

It should be appreciated that the specific steps illustrated in FIGS. 4-5 provide particular methods in accordance with embodiments of the present invention. The steps outlined above may be carried out by system software and/or hardware, and in some embodiments the steps may be continuously repeated. Also, other sequences of steps may be performed according to alternative embodiments. For example, the steps outlined above may be performed in a different order. Moreover, the individual steps illustrated in FIGS. 4-5 may include multiple sub-steps that may be performed in various sequences as appropriate to the individual step. Furthermore, additional steps may be added or removed depending on the particular application. One of ordinary skill in the art would recognize many variations, modifications, and alternatives.

Figure 6:
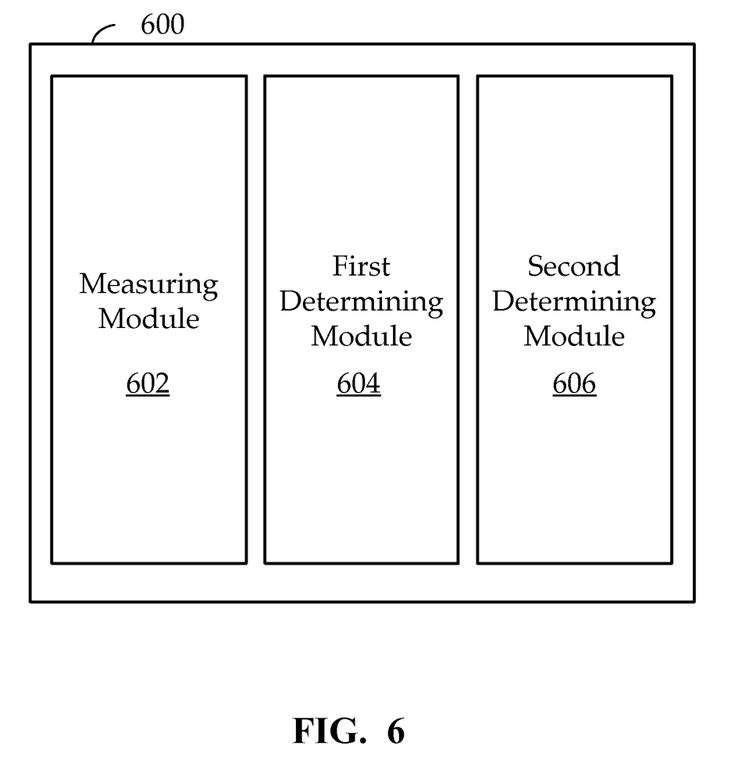
FIG. 6 is a simplified block diagram of a user terminal in a satellite communications system in accordance with an embodiment of the present invention.

FIG. 6 is a simplified block diagram of a user terminal 600 in a satellite communications system in accordance with an embodiment of the present invention. The user terminal 600 includes a measuring module 602 configured to measure a signal characteristic of one or more first messages sent from the user terminal 600 at a first transmission frequency. The measuring module 602 may also be configured to measure a signal characteristic of one or more second messages sent from the user terminal 600 at a second transmission frequency. In an embodiment, the signal characteristic of the one or more first messages and of the one or more second messages may be a signal power. In another embodiment, the signal characteristic of the one or more first messages and the one or more second messages may be measured at an outdoor unit of the user terminal 600. The user terminal 600 also includes a first determining module 604 configured to determine a frequency gain of the user terminal 600 based at least in part on the signal characteristic of the one or more first messages and the one or more second messages. The user terminal 600 also includes a second determining module 606 configured to determine an attenuation setting of the user terminal 600 at a third transmission frequency based at least in part on the frequency gain. The first transmission frequency, the second transmission frequency, and the third transmission frequency may each be different frequencies. In an embodiment, the user terminal 600 may also include a transmitting module configured to transmit a third message at the third transmission frequency using the attenuation setting.

It should be noted that the methods and apparatuses discussed throughout the specification are provided merely as examples. Various embodiments may omit, substitute, or add various procedures or components as appropriate. For instance, it should be appreciated that features described with respect to certain embodiments may be combined in various other embodiments. Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may be adapted to perform the necessary tasks. The term "computer-readable medium" includes, but is not limited to, portable or fixed storage devices, optical storage devices, wireless channels, sim cards, other smart cards, and various other mediums capable of storing, containing, or carrying instructions or data.

Having described several embodiments, it will be recognized by those of skill in the art that various modifications, alternative constructions, and equivalents may be used without departing from the spirit of the invention. For example, the above elements may be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for determining attenuation settings across carriers in a return link from a user terminal to a gateway terminal via a satellite in a satellite communications system, the method comprising:
    determining a first attenuation setting for a first carrier of the carriers in the return link, the first attenuation setting based at least in part on a first signal quality metric value of a first message previously sent on the first carrier;
    determining a second attenuation setting for a second carrier of the carriers in the return link, the second attenuation setting based at least in part on a second signal quality metric value of a second message previously sent on the second carrier, the first attenuation setting being different than the second attenuation setting, the first carrier being different than the second carrier, and the carriers in the return link including the first carrier, the second carrier, and additional carriers; and
    computing a respective attenuation setting for each of the additional carriers in the return link not including the first carrier and the second carrier based at least in part on the first attenuation setting and the second attenuation setting.

2. The method of claim 1 further comprising transmitting a burst transmission from the user terminal to the gateway terminal, the burst transmission transmitted on a third carrier of the carriers in the return link using a third attenuation setting, the third attenuation setting being one of the respective attenuation settings computed based on the first attenuation setting and the second attenuation setting.

3. The method of claim 1 wherein the first message comprises a plurality of first periodic management messages and wherein the first attenuation setting is determined based on an average of the first signal quality metric values of the plurality of first periodic management messages, and the second message comprises a plurality of second periodic management messages and wherein the second attenuation setting is determined based on an average of the second signal quality metric values of the plurality of second periodic management messages.

4. The method of claim 1 wherein the first signal quality metric value is based on a signal power estimate of the first message sent on the first carrier and the second signal quality metric value is based on a signal power estimate of the second message sent on the second carrier.

5. The method of claim 1 wherein the first signal quality metric value is based on a first signal-to-noise ratio of the first carrier and the second signal quality metric value is based on a second signal-to-noise ratio of second first carrier.

6. The method of claim 1 wherein the first attenuation setting is based on one or more measurements performed at the user terminal.

7. The method of claim 1 wherein the first attenuation setting is based on one or more measurements performed at the gateway terminal.

8. A user terminal in a satellite communications system, comprising:
    a measuring module configured to measure a signal characteristic of one or more first messages sent from the user terminal at a first transmission frequency and to measure a signal characteristic of one or more second messages sent from the user terminal at a second transmission frequency;
    a first determining module configured to determine a gain at the first transmission frequency and a gain at the second transmission frequency based at least in part on the signal characteristic of the one or more first messages and the signal characteristic of the one or more second messages; and
    a second determining module configured to determine an attenuation setting of the user terminal at a third transmission frequency based at least in part on the gain at the first transmission frequency and the gain at the second transmission frequency, wherein the first transmission frequency, the second transmission frequency, and the third transmission frequency are each different frequencies.

9. The user terminal of claim 8 wherein the signal characteristic of the one or more first messages is a signal power of the one or more first messages, and the signal characteristic of the one or more second messages is a signal power of the one or more second messages.

10. The user terminal of claim 8 wherein the signal characteristic of the one or more first messages is measured by an outdoor unit of the user terminal, and the signal characteristic of the one or more second messages is measured by the outdoor unit of the user terminal.

11. The user terminal of claim 8 further comprising a transmitting module configured to transmit a third message at the third transmission frequency using the attenuation setting of the user terminal determined by the second determining module.

* * * * *